Figure 1:
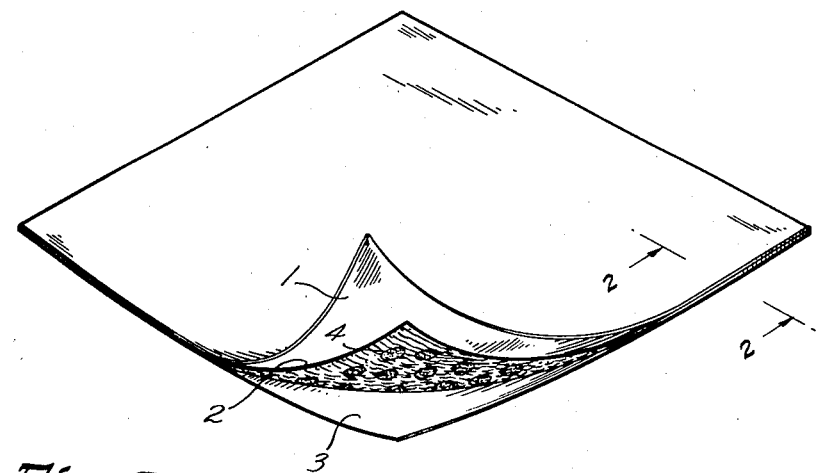

Patented Aug. 15, 1950

2,518,762

UNITED STATES PATENT OFFICE 2,518,762

CURED MEAT WRAPPER

Ernest C. Draheim, Rhinelander, Wis., assignor to Daniels Manufacturing Company, Rhinelander, Wis., a corporation of Wisconsin Application December 19, 1946, Serial No. 717,196

3 Claims. (Cl. 154—50)

This invention relates to protective wrappers and resides more particularly in a sheet wrapping structure particularly adapted for the wrapping of cured meats in which an interior grease barrier sheet is bonded adhesively to an intermediate bibulous cushioning sheet which is in turn adhesively bonded to an exterior protective sheet, the bonding of the several sheets being such as to permit limited ventilation between the several sheets and limited relative motion between the several sheets so as to permit creasing and flexing of the composite wrapper without rupture of any of the sheets.

One object of this invention is to provide a sheet material for the wrapping of cured meats such as ham which may be handled as a single, unitary wrapper without the necessity for assembling a plurality of separate sheets.

Another object of this invention is to provide a wrapper for cured meats and the like which is strong and flexible and free of the tendency to rupture at corner folds and thus is adapted to effectively enclose and protect material wrapped therein.

Another object of this invention is to provide a wrapper for cured meats and the like which offers an effective barrier to the penetration of fats, oils and juices so as to increase the attractiveness of materials wrapped therein.

Another object of this invention is to provide a wrapper for cured meat and the like having a reduced tendency to promote the growth of mold and other organisms within the several layers composing its structure by reason of effective ventilation.

Heretofore wrappers for cured meats have consisted of multiple layers of wrapping sheets, each sheet of the layer being separate and independent. The separate handling of the several layer sheets during wrapping has been inconvenient. Efforts to employ multiple ply wrappers in which the several plies are united into a single wrapping element have not heretofore been found successful. Such wrapping materials have been prone to promote growth of mold and other organisms within the several plies. Furthermore, such composite ply materials have not had desired flexibility. Where sharp corners and pockets are formed in folding such multiple ply materials have been susceptible of rupture thus defeating the purpose of the wrapping.

It is the discovery of this invention that where multiple ply wrapping units are prepared employing an absorbent or bibulous blotting layer between the outer protective layer and the inner grease resistant layer and the several layers are united to one another by discontinuous areas of adhesive so as to leave a major portion of the facing surfaces free, ventilation between layers sufficient to impede growth of mold or other organisms will take place. Furthermore, when the layers are thus attached the multiple ply material thus formed is of a flexibility sufficient to permit the formation of tightly creased folds and corner pockets in wrapping with no undue tendency of the material to rupture.

This invention is herein described by reference to the accompanying drawing in which there is set forth by way of illustration and not of limitation one form in which a wrapping member may be constructed in accordance with this invention.

Figure 2:
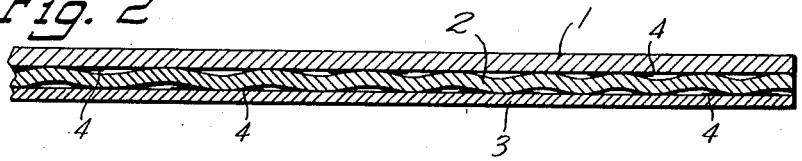
Figure 3:
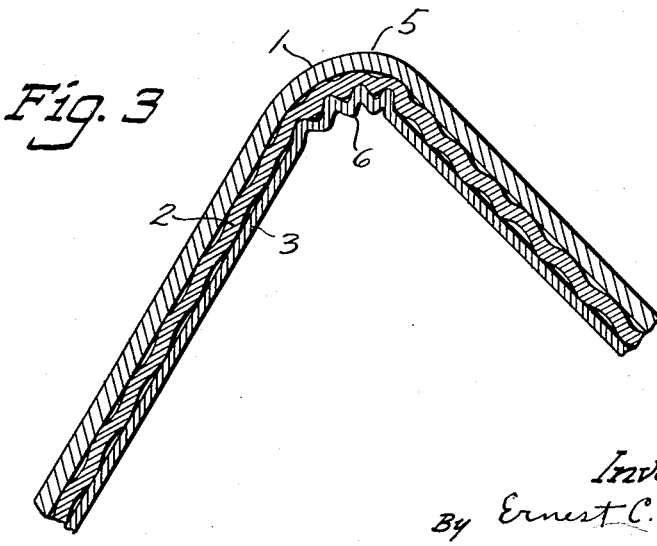

In the drawing:

Fig. 1 is a perspective view of a wrapping member constructed in accordance with this invention the several plies of the same being shown separated from one another at one corner, Fig. 2 is an enlarged elevational view in section of the wrapping member shown in Fig. 1, and Fig. 3 is an enlarged elevational view in section of the material shown in Fig. 1 the same having been flexed so as to illustrate the action of the plies at the point of flexure.

Referring now to the drawing a multiple ply wrapper prepared in accordance with this invention is shown. In Fig. 1 the wrapping unit will be observed as being composed of an outer protecting sheet 1 composed of a strong paper such as so-called vegetable parchment or lightweight kraft or any other suitable paper having desired protective and ornamental properties. The outer protective sheet may be employed plain or may be printed upon to identify the contents enclosed by the wrapper.

Beneath the covering sheet 1 is an absorbent cushion layer 2 formed of unsized, water-formed sulphite or ground pulp paper or of other absorbent and bibulous paper composition. The cushion layer 2 preferably is creped as indicated in Fig. 1 so as to provide a perceptible capacity for elongation.

Beneath the cushion layer 2 there is provided an interior barrier sheet 3. The sheet 3 may be composed of a grease and moisture resistant stock such as glassine paper, regenerated cellulose or any of the highly grease resistant materials of that class which are available.

Uniting the layer 1 to the layer 2 and the layer 3 likewise to the layer 2, discontinuous areas of adhesive 4, as appears in Fig. 1 are provided. The adhesive areas 4 are preferably relatively small in extent and are spaced one from another sufficiently so as to leave a major part of the facing areas between adjacent layers free of adhesive. As is indicated in Figs. 1 and 2 the free spaces not occupied by adhesive cooperating with free spaces resulting from the creped configuration of the cushion sheet 2 provide ventilation channels which communicate throughout the interior of the multiple ply material. Juices which diffuse through the barrier sheet into the cushion sheet 2 and are there absorbed may thus gradually be dissipated by evaporation at a rate commensurate with the rate of diffusion through the layer 3. Residuals accumulating in the cushion sheet 2 as a result of such action are, therefore, of high concentration and do not favorably support growth of mold and other organisms.

As appears more clearly in Fig. 3 the material of this invention may be sharply folded without creation of high tensile or compressive stresses in the material. The outer covering sheet I by nature is incapable of substantial elongation and, therefore, upon the formation of the fold assumes a configuration as indicated at 5. The tensile stress set up in the covering layer I, however, is low by reason of the flexibility of the cushion layer 2 and by reason of the fact that the barrier sheet 3, only imperfectly united with the cushion 2, may freely assume a crinkled configuration as appears at 6, thus relieving the establishment of high compressive forces which would otherwise place the covering layer I under severe tension. The multiple ply unit of this invention, therefore, forms a durable and tight wrapper without danger of rupture forming at sharp corners in the folds.

It will, of course, be understood that any one or more of the layers forming the laminated assembly of this invention may in and of themselves be multiple layers. For example, the cushion layer 2 may be formed of two or more united layers of suitable bibulous sheet material. A multiple protective layer I may also be employed where particularly severe handling is likely to be encountered. The same applies to the interior barrier sheet 3 which may be made up as desired employing laminated materials. The various forms of barrier sheets suitable for this invention are herein referred to as highly integrated sheet materials.

Suitable for employment as adhesives are a wide variety of substances inert with respect to food products and these are preferred. For example, amorphous wax compositions are particularly suitable. However, adhesives formed from wax-like substances derived from sources other than petroleum as well as non-waxy materials such as sodium silicate and the like may be employed, as well as adhesives derived from animal or vegetable sources.

I claim:

1. In a multiple ply wrapping unit for cured meats the combination comprising an exterior protective wrapping sheet, a bibulous cushion sheet of water-formed paper stock beneath said covering sheet, a grease and moisture-resistant barrier sheet composed of highly integrated paper material beneath said cushion sheet, and an adhesive disposed in discontinuous areas between said cushion sheet and said covering sheet and between said cushion sheet and said barrier sheet adhesively bonding the adjacent facing surfaces of said sheets, said areas to which said adhesive is applied constituting a minor fraction of the adjacent facing areas of said sheets to provide ventilation spaces and a limited freedom of relative movement between said sheets.

2. In a multiple ply wrapping unit for cured meats the combination comprising an exterior protective high strength paper wrapping sheet, a bibulous cushion sheet of water-formed paper stock having irregular surfaces beneath said covering sheet, a grease and moisture resistant barrier sheet composed of glassine paper beneath said cushion sheet, and an adhesive disposed in discontinuous areas between said cushion sheet and said covering sheet and between said cushion sheet and said barrier sheet adhesively bonding the adjacent facing surfaces of said sheets, said areas to which said adhesive is applied constituting a minor fraction of the facing areas of said sheets to provide ventilation spaces and a limited freedom of relative movement between said sheets.

3. In a multiple ply wrapping unit for cured meats the combination comprising an exterior protective high strength paper wrapping sheet, a bibulous cushion sheet of water-formed creped paper stock beneath said covering sheet, a grease and moisture resistance barrier sheet composed of glassine paper beneath said cushion sheet, and an amorphous wax adhesive disposed in discontinuous areas between said cushion sheet and said covering sheet and between said cushion sheet and said barrier sheet adhesively bonding the adjacent facing surfaces of said sheets, said areas to which adhesive is applied constituting a minor fraction of the facing areas of said sheets to provide ventilation spaces and a limited freedom of movement between said sheets.

ERNEST C. DRAHEIM.

REFERENCES CITED

The following references are of record in the file of this patent:

UNITED STATES PATENTS

| Number | Name | Date |
|---|---|---|
| 798,313 | Alexander | Aug. 29, 1905 |
| 1,341,955 | White | June 1, 1920 |
| 1,445,070 | Clune | Feb. 13, 1923 |
| 1,963,118 | Clark | June 19, 1934 |
| 2,142,463 | Upson | Jan. 3, 1939 |
| 2,284,944 | Bruning | June 2, 1942 |